United States Patent
Sinanoglu et al.

(10) Patent No.: US 10,153,769 B2
(45) Date of Patent: *Dec. 11, 2018

(54) SYSTEMS, PROCESSES AND COMPUTER-ACCESSIBLE MEDIUM FOR PROVIDING LOGIC ENCRYPTION UTILIZING FAULT ANALYSIS

(71) Applicant: New York University, New York, NY (US)

(72) Inventors: Ozgur Sinanoglu, Abu Dhabi (AE); Youngok Pino, Rome, NY (US); Jeyavijayan Rajendran, Brooklyn, NY (US); Ramesh Karri, New York, NY (US)

(73) Assignee: New York University, New York, NY (US)

( * ) Notice: Subject to any disclaimer, the term of this patent is extended or adjusted under 35 U.S.C. 154(b) by 423 days.

This patent is subject to a terminal disclaimer.

(21) Appl. No.: 14/797,841

(22) Filed: Jul. 13, 2015

(65) Prior Publication Data

US 2016/0049935 A1     Feb. 18, 2016

Related U.S. Application Data (63) Continuation of application No. 13/735,642, filed on Jan. 7, 2013, now Pat. No. 9,081,929.

(60) Provisional application No. 61/583,989, filed on Jan. 6, 2012.

(51) Int. Cl.
| | |
|---|---|
| *G06F 17/50* | (2006.01) |
| *H03K 19/003* | (2006.01) |
| *G09C 1/00* | (2006.01) |
| *H04L 9/08* | (2006.01) |

(52) U.S. Cl.
CPC ......... *H03K 19/003* (2013.01); *G06F 17/505* (2013.01); *G06F 17/5072* (2013.01); *G09C 1/00* (2013.01); *H04L 9/0866* (2013.01); *G06F 17/504* (2013.01); *H04L 2209/12* (2013.01)

(58) Field of Classification Search
None
See application file for complete search history.

(56) References Cited

U.S. PATENT DOCUMENTS

| | | |
|---|---|---|
| 3,735,255 A | 5/1973 | Goldman |
| 4,875,209 A | 10/1989 | Mathewes et al. |
| 6,782,515 B2 | 8/2004 | Scott et al. |

(Continued)

OTHER PUBLICATIONS

M.-D. Yu et al., "Secure and Robust Error Correction for Physical Unclonable Functions," IEEE Design & Test of Computers, 2010, pp. 48-65.*

(Continued)

*Primary Examiner* — Leigh Garbowski
(74) *Attorney, Agent, or Firm* — Hunton Andrews Kurth LLP (57) ABSTRACT

Exemplary systems, methods and computer-accessible mediums can encrypting a circuit by determining at least one location to insert at least one gate in the circuit using a fault analysis, and inserting the at least one gate in at least one section of the at least one location. The determination can include an iterative procedure that can be a greedy iterative procedure. The determination can be based on an effect of the particular location on a maximum number of outputs of the circuit.

16 Claims, 6 Drawing Sheets

(56) References Cited

U.S. PATENT DOCUMENTS

| | | | |
|---|---|---|---|
| 7,139,956 | B2 | 11/2006 | Nozuyama |
| 7,417,468 | B2 | 8/2008 | Verbauwhede et al. |
| 7,900,112 | B2 | 3/2011 | Pichamuthu et al. |
| 8,176,448 | B2 * | 5/2012 | Koushanfar ........ G06F 17/5045 716/101 |
| 8,280,688 | B2 | 10/2012 | Huang et al. |
| 8,350,574 | B2 | 1/2013 | Nobukata |
| 8,402,401 | B2 * | 3/2013 | Chakraborty ......... G06F 17/505 713/189 |
| 8,955,160 | B2 * | 2/2015 | Danger ................... G06F 21/75 726/34 |
| 9,081,929 | B2 * | 7/2015 | Sinanoglu ............. G06F 17/505 |
| 2003/0149916 | A1 | 8/2003 | Ohtake et al. |
| 2003/0154432 | A1 | 8/2003 | Scott et al. |
| 2004/0078175 | A1 | 4/2004 | Shaw et al. |
| 2009/0288046 | A1 | 11/2009 | Dorsch et al. |

OTHER PUBLICATIONS

H.K. Lee et al., "An Efficient, Forward Fault Simulation Algorithm Based on the Parallel Pattern Single Fault Propagation," IEEE Int'l Test Conference 1991, Paper 35.1, pp. 946-955.*

K. De, "Test Methodology for Embedded Cores which Protects Intellectual Property," 1997 IEEE, pp. 2-9.*

B. Barak et al., "On the (im)possibility of Obfuscating Programs," Journal of the ACM, vol. 59, No. 2, Article 6, Apr. 2012, 48 pages.*

R. S. Chakraborty et al., "Security against Hardware Trojan through a Novel Application of Design Obfuscation," 2009 IEEE/ACM Int'l Conference on CAD Digest of Technical Papers, pp. 113-116.*

B. Gassend et al., "Silicon Physical Random Functions," 2002 ACM, CCS'02, pp. 148-160.*

B. Gassend et al., "Controlled Physical Random Functions," Proc. of the 18$^{th}$ Annual Computer Security Applications Conference (ACSAC'02), 2002 IEEE, 12 pages.*

J. Huang et al., "IC Activation and User Authentication for Security-Sensitive Systems," 2008 IEEE Int'l Workshop on Hardware-Oriented Security and Trust, pp. 76-80.*

R. Karri et al., "Trustworthy Hwardware: Identifying and Classifying Hardware Trojans," Computer, Oct. 2010, pp. 39-46.J.*

W. Lee et al., "A Technique to Build a Secret Key in Integrated Circuits for Identificationa nd Authentication Applications," 2004 Symposium on VLSI Circuits Digest of Technical Papers, pp. 176-178.*

J. Rajendran et al., "Securing Processors Against Insider Attacks: A Circuit Microarchitecture Co-Design Approach," IEEE Design & Test, Mar./Apr. 2013, pp. 35-44.*

J. Rajendran et al., "Security Analysis of Logic Obfuscation," ACM DAC 2012, pp. 83-89.*

KPMG, "Managing the risks of counterfeiting in the information technology," www.agmaglobal.org/press-events/press-docs/Counterfeit-WhitePaper_Final.pdf, 2006 20 pages.

Semi, "Innovation is at risk as semiconductor equipment and materials industry loses up to $4 billion annually due to IP infringement," www.semi.org/en/Press/P043775, 2008 2 pages.

J. Roy, F. Koushanfar, and I. Markov, "EPIC: Ending Piracy of Integrated Circuits," Proceedings of the IEEE/ACM Design, Automation and Test in Europe, pp. 1069-1074, 2008.

"Defense Science Board (DSB) study on High Performance Microchip Supply," http://www.acq.osd.mil/dsb/reports/ADA435563.pdf, Feb. 2005, 117 pages.

Y. Alkabani and F. Koushanfar, "Active hardware metering for intellectual property protection and security," Proceedings of USENIX security, pp. 291-306, 2007.

R. Chakraborty and S. Bhunia, "HARPOON: An Obfuscation-Based SoC Design Methodology for Hardware Protection," IEEE Transactions on Computer-Aided Design of Integrated Circuit and Systems. vol. 28. No. 10, Oct. 2009, pp. 1493-1502.

A. Baumgarten, A. Tyagi, and J. Zambreno, "Preventing IC Piracy Using Reconfigurable Logic Barriers," IEEE Design and Test of Computers, vol. 27, No. 1, pp. 66-75, 2010.

G. Suh and S. Devadas, "Physical Unclonable Functions for Device Authentication and Secret Key Generation," Proceedings of the IEEE/ACM Design Automation Conference, pp. 9-14, 2007.

M. L. Bushnell and V. D. Agrawal, "Essentials of Electronic Testing for Digital, Memory, and Mixed-Signal VLSI Circuits," Kluwer Academic Publishers, Boston, 2000 pp. 310-690.

www.tiempo-ic.com/uploads/Docs/TPKA_Datasheet.pdf 2 pages.

H. Lee and D. S. Ha, "HOPE: An Efficient Parallel Fault Simulator for Synchronous Sequential Circuits," IEEE Transactions on Computer-Aided Design of Integrated Circuits and Systems, vol. 15, No. 9, Sep. 1996, pp. 1048-1058.

H. Heys and S. Tavares, "Avalanche characteristics of substitution-permutation encryption networks," IEEE Transactions on Computers, vol. 44, No. 9, pp. 1131-1139, 1995.

"Specification for the Advanced Encryption Standard (AES)," Federal Information Processing Standards Publication 197, 2001, 51 pages.

M.-D. Yu and S. Devadas, "Secure and Robust Error Correction for Physical Unclonable Functions," IEEE Design and Test of Computers, vol. 27, No. 1, pp. 48-65, 2010.

Sinanoglu et al., "Partial Core Encryption for Performance-Efficient Test of SOCs," ICCAD 2003, pp. 91-93.

"Sciworx RSA Co-Processor;" http://www.sci-worx.com/products/cryptography/rsa-co-processor.html.

* cited by examiner

FIG. 1C (a) A faulty circuit (b) An encrypted circuit with a wrong key (K1 = 1) equivalent to the faulty circuit (c) A circuit encrypted with three XOR gates (E1, E2, and E3)

Fig. 1: Relation between logic encryption and fault analysis in IC testing – fault excitation, propagation, and masking.

FIG. 2A

FIG. 2B (a) Before encryption (b) After encryption

Fig. 2: Logic Encryption Cell (dotted components): A primitive for encrypting logic.

Fig. 3: Comparison of (a) random insertion based logic encryption and (b) fault analysis based logic encryption for different ISCAS-85 benchmark circuits.

Fig. 4: Power-delay product overhead of random insertion based and fault analysis based logic encryptions.

Fig. 5: Area overhead of random insertion based and fault analysis based logic encryptions.

Fig. 6: Avalanche factor for the random insertion based logic encryption and the fault analysis based logic encryption.

SYSTEMS, PROCESSES AND COMPUTER-ACCESSIBLE MEDIUM FOR PROVIDING LOGIC ENCRYPTION UTILIZING FAULT ANALYSIS

CROSS-REFERENCE TO RELATED APPLICATIONS

This application relates to a continuation of U.S. application Ser. No. 13/735,642 filed on Jan. 7, 2013, which will issue as U.S. Pat. No. 9,081,929 on Jul. 14, 2015, which claims the benefit of priority from U.S. patent application Ser. No. 61/583,989, filed Jan. 6, 2012, the entire disclosures of which is incorporated herein by reference in their entireties.

STATEMENT REGARDING FEDERALLY SPONSORED RESEARCH

The present disclosure was made with government support under Contract No. FA8750-11-2-0274 awarded by the Air Force Research Laboratory. Accordingly, the government has certain rights in the invention.

FIELD OF THE DISCLOSURE

Exemplary embodiments of the present disclosure relate to exemplary systems, methods and computer-accessible mediums for encrypting integrated circuits, and more specifically to systems, methods and computer-accessible mediums for utilizing fault analysis to encrypt integrated circuits.

BACKGROUND INFORMATION

Globalization of Integrated Circuit ("IC") design is making IC/Intellectual Property ("IP") designers and users reevaluate their trust in hardware. (See, e.g., Reference 4). As the IC design flow can be distributed worldwide, hardware can be prone to new kinds of attacks such as, for example, reverse engineering and IP piracy. (See, e.g., Reference 5). An attacker, anywhere in this design flow can reverse engineer the functionality of an IC/IP. He/she can then steal and claim ownership of the IP. An untrusted IC fabrication company can overbuild ICs and sell them illegally. Finally, rogue elements in the fabs can insert malicious circuits into the design without the designer's knowledge. (See, e.g., Reference 4). Because of these attacks, the semiconductor industry loses $4 billion annually. (See, e.g., References 1 and 2). However, if a designer is able to conceal the functionality of an IC while it passes through the different, potentially untrustworthy, phases of the design flow, these attacks can be thwarted. (See, e.g., Reference 3).

Using logic encryption of hardware or "logic obfuscation" has been used. (See, e.g., References 3 and 6). Logic encryption of hardware does no not necessarily mean encrypting the design file by a cryptographic algorithm, instead it can mean hiding the hardware's functionality. Obfuscation, however, can have a different meaning in software. An obfuscated program can be difficult to reconstruct even if its functionality is known. Obfuscation can hide the implementation and not the function. To highlight this difference, logic encryption can be used to denote that the functionality can be encrypted when the valid key is not applied to the design, and "logic obfuscation can hide the functionality and the implementation of a design by inserting some additional circuit elements into the original design. In order for the design to exhibit its correct functionality (e.g., produce correct outputs), a valid key can be preferably supplied to the encrypted design. Upon applying a wrong key, the encrypted design can exhibit a wrong functionality (e.g., produce wrong outputs).

While it passes through the untrusted design phases, an IC can be in an encrypted form so that its functionality is not revealed; this can prevent reverse engineering, cloning, trojan insertion and overbuilding. The designer can give the valid key to the end-user of the IC so that the end-user can enable the IC to exhibit its correct functionality.

In an encrypted design, a wrong key preferably results in a wrong output for all input patterns. If a correct output is produced for a wrong key, then the encryption procedure is weak and the attacker can benefit. If a wrong key affects only one or a few of the output bits, then the attacker might be able to tolerate the wrong outputs. If all the output bits are affected, then the wrong output can be the complement of the correct output. Therefore, ideally, a wrong key preferably affects half of the output bits (e.g., the Hamming distance between the correct and wrong outputs should be 50%). (See, e.g., Reference 7). This 50% Hamming distance can render a very high obscureness to an attacker.

Furthermore, in another form of attack, end-users can collude by sharing their valid keys. To prevent this collusion attack, each IC preferably has its own unique key. (See, e.g., Reference 8).

Logic encryption techniques can be broadly classified into two types, sequential and combinational. In a sequential logic encryption, additional logic states (e.g., black) are typically introduced in the state transition graph. (See, e.g., References 5 and 6). The state transition graph can be modified in such a way that the design can reach a valid state only on applying a correct sequence of key bits. If the key can be withdrawn, the design, once again can end up in a black state. However, the effectiveness of these methods in producing a wrong output has not been demonstrated.

In a combinational logic encryption, XOR/XNOR gates can be introduced to conceal the functionality of a design. (See, e.g., Reference 3). Usually, one of the inputs in these inserted gates serves as a 'control input', which can be a newly added primary input. It possible to configure these gates as buffers or inverters using these control inputs. The values applied to these control inputs can be the keys. As described herein, when gates are randomly inserted into the design, a wrong key may not affect the output, as its effects may not propagate to the outputs. This can be similar to an IC testing scenario where the effect of a fault may not propagate to the output.

Apart from sequential and combinational elements, memory elements can also be inserted into the design. (See, e.g., Reference 7). The circuit preferably functions correctly only when these elements are configured/programmed correctly. However, the introduction of memory elements in the circuit can incur significant performance overhead.

Thus, it may be beneficial to address at least some of the above-described deficiencies.

SUMMARY OF EXEMPLARY EMBODIMENTS

Exemplary embodiments of the present disclosure can relate combinational logic encryption and IC fault testing to facilitate the propagation of the effects of wrong keys to the outputs. Traditional IC testing procedures can analyze the effect of faults and ways to propagate the faults to outputs, and exemplary embodiments of the present disclosure can incorporate certain testing procedures to perform logic encryption. An exemplary procedure according to certain exemplary embodiments of the present disclosure can guide the XOR/XNOR insertions using conventional fault simulation techniques and tools (see, e.g., Reference 9) and can corrupt 50% of output bits for a wrong key.

According to certain exemplary embodiments of the present disclosure, in order to prevent collusion attack, Physical Unclonable Functions ("PUFs") can be incorporated to produce unique user keys for each IC even though the ICs can be encrypted with the same valid key. (See, e.g., References 3 and 8). To prevent a user from gaining access to the valid key used for encryption, an RSA unit can separate the user key from the valid key. As an RSA unit can have a large overhead, certain exemplary embodiments of the present disclosure can provide a simple Logic Encryption Cell (LEC) which can include XOR/XNOR gates for encryption.

Certain exemplary embodiments of the present disclosure can relate logic encryption to fault propagation analysis in IC testing, can provide a procedure to encrypt logic by inserting XOR/XNOR gates, and can provide a low-overhead LEC for logic encryption.

In certain exemplary embodiments of the present disclosure, an exemplary fault analysis based logic encryption can be provided, which can achieve 50% Hamming distance between the correct and the corresponding wrong outputs when an invalid key is applied to the design.

Certain exemplary embodiments of the present disclosure can employ a single fault simulator. Accordingly, in certain exemplary embodiments of the present disclosure, an iterative procedure can be provided to determine the fault impact in the presence of fault masking. Logic encryption can also be performed non-iteratively by using a fault simulator that supports multiple stuck-at fault models to account for fault masking effects. To encrypt a large design such as C7552, the exemplary procedure can take two hours. The exemplary procedure can be scaled to large designs by applying it on smaller partitions in these designs.

The exemplary fault-analysis based logic encryption technique can be extended to perform sequential logic encryption. To reduce the impact on power, area, and delay, one can also perform a power, area, and delay constrained insertion of XOR/XNOR gates.

These and other objects, features and advantages of the exemplary embodiment of the present disclosure will become apparent upon reading the following detailed description of the exemplary embodiments of the present disclosure, when taken in conjunction with the appended claims.

BRIEF DESCRIPTIONS OF THE DRAWINGS

Further objects, features and advantages of the present disclosure will become apparent from the following detailed description taken in conjunction with the accompanying Figures showing illustrative embodiments of the present disclosure, in which.

Throughout the drawings, the same reference numerals and characters, unless otherwise stated, are used to denote like features, elements, components, or portions of the illustrated embodiments. Moreover, while the present disclosure will now be described in detail with reference to the figures, it is done so in connection with the illustrative embodiments and is not limited by the particular embodiments illustrated in the figures.

DETAILED DESCRIPTION OF EXEMPLARY EMBODIMENTS

Exemplary Fault Analysis-Based Logic Encryption
Exemplary Logic Encryption from a Fault Analysis Perspective According to exemplary embodiments of the present disclosure, a design can be encrypted using XOR/XNOR gates in such a way that any wrong key causes a wrong output. This can be similar, for example, to a situation where a circuit produces a wrong output when it has a fault that has been excited and propagated to the outputs. The following observations can relate logic encryption and fault analysis in IC testing. These observations can be used to insert XOR/XNOR gates.

Exemplary Fault Excitation:

Application of a wrong key can be associated with the activation of a fault. For a wrong key, either a stuck-at-0 ("s-a-0") or stuck-at-1 ("s-a-1") fault will get excited, for example, when XOR/XNOR gates are used for encryption.

Example 1

Figure 1A:
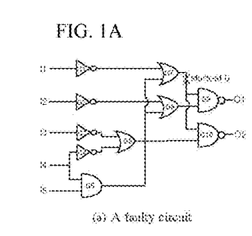
FIGS. 1(a)-1(c) are exemplary schematic diagrams showing exemplary relations between logic encryption and fault analysis in IC testing according to certain exemplary embodiments of the present disclosure.
Figure 1B:
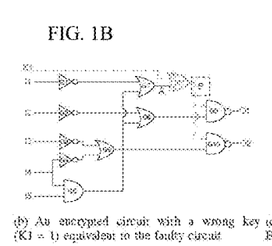

Consider the exemplary C17 circuit encrypted with one XOR gate (E1) as shown in FIG. 1(b). If a wrong key (K1=1) is applied to the circuit, the value of net B can be the negated value of net A. This can be the same as exciting a s-a-0 (e.g., when A=1) or s-a-1 (e.g., when A=0) fault at the output of G7 as shown in FIG. 1(a).

Exemplary Fault Propagation:

Not all wrong keys can corrupt the output as the effects of a wrong key can be blocked for some of the input patterns. This can be similar, for example, to the scenario where not all input patterns can propagate the effect of a fault to the output.

Example 2

Consider the exemplary circuit shown in FIG. 1(b). A wrong key (K1=1) can be applied to the circuit. For example, for the input pattern 00000, a s-a-0 fault can get excited at the output of E1 and propagated to both outputs. The value at the output of the gate E1 can be, for example, 0 instead of 1, and the output can be 11 instead of the correct output 00.

For the input pattern 01110, even though the s-a-0 fault can get excited at the output of E1, the output can be 00, which can be the same as the functional output, as the fault effects can be blocked.

To propagate the effect of an excited fault, wrong key, non-controlling, values can be applied to the other inputs of the gates that are on the propagation path of the fault. Since not all input patterns guarantee the non-controlling values on the fault propagation path, a wrong key will not always corrupt the output.

Exemplary Fault Masking:

As described above, inserting a single XOR/XNOR gate and applying a wrong key can be the equivalent of exciting a single stuck-at fault. Inserting multiple XOR/XNOR gates and applying a wrong key can be the equivalent to exciting multiple stuck-at faults. However, when multiple faults are excited, they might mask each other's effect. Therefore, in logic encryption, when multiple XOR/XNOR gates are inserted, the effect of one XOR/XNOR gate might mask the other's effect.

Example 3

Figure 1C:
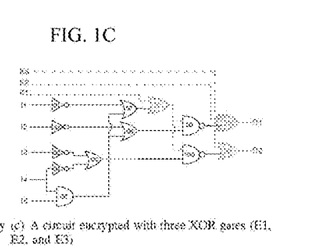

Consider the exemplary encrypted circuit shown in FIG. 1(c). When the key bits (e.g., K1, K2, and K3) are 000, the correct functional output can be 00 for the input pattern '00000'. However, if the key bits are 111 (e.g., a wrong key), the effect introduced by the XOR gate E1 can be masked by the XOR gates E2 and E3 and can produce a correct output 00. Thus, similar to fault masking, the effect of one XOR gate can be masked by the effect of the other two XOR gates.

Exemplary Goal:

Insert XOR/XNOR gates such that a wrong key will affect 50% of the outputs. In terms of fault simulation, this goal can be stated as finding a set of faults, which together will affect 50% of the outputs for a wrong key.

Exemplary Challenge:

Fault simulation tools typically rely on the assumption of a single stuck-at fault model (e.g., only one fault can be present at any time). Thus, by using the existing commercial fault simulation tools, typically only one XOR/XNOR gate can be inserted at a time. This challenge can be overcome by using a greedy iterative procedure where XOR/XNOR gates can be inserted iteratively. For example, in each iteration, the fault that has the potential of propagating to a maximum number of outputs can dictate the location of the XOR/XNOR gate to be inserted. For each iteration, except the first iteration, the XOR/XNOR gates inserted at previous iterations can be provided with random wrong keys thereby emulating a multiple stuck-at fault scenario, and accounting for the previous XOR/XNOR insertions. The exemplary systems, methods and computer-accessible mediums can provide a procedure to perform this logic encryption.

Exemplary Fault Impact

To insert an XOR/XNOR gate, the location in the circuit where a fault occurs that can affect most of the outputs for most of the input patterns, can be determined. To determine this location, a term called fault impact can be defined, which is shown in Equation 1. From a set of test patterns, the number of patterns that detect the s-a-0 fault (No. of Test Patterns$_{s-a-0}$) at the output of a gate G$_x$ and the cumulative number of output bits that get affected by that s-a-0 fault (No. of Outputs$_{s-a-0}$) can be computed. Similarly, No. of Test Patterns$_{s-a-1}$ and No. of Output$_{s-a-1}$ can also be computed.

$$\text{Fault impact} = (\textit{No. of Test Patterns}_{s-a-0} \times \textit{No. of Outputs}_{s-a-0}) + \quad (1)$$
$$(\textit{No. of Test Patterns}_{s-a-1} \times \textit{No. of Outputs}_{s-a-1})$$

Upon inserting the XOR/XNOR gate for encryption at the location with the highest fault impact, an invalid key will likely have the most impact on the outputs.

Exemplary Procedure to Insert XOR/XNORs

Procedure (1) indicated below greedily selects the best 'N' locations in a circuit to insert the XOR/XNOR gates. For example, the location with the highest fault impact can be calculated and an XOR/XNOR gate can be inserted at that location. The exemplary systems, methods and computer-accessible mediums can consider the previously inserted XOR and XNOR gates in this calculation. The exemplary systems, methods and computer-accessible mediums can terminate on inserting the maximum number of XOR/XNOR gates, and, for example, can be represented by:

```
Input : Netlist, KeySize
Output: Encrypted netlist
for i ← 1 to KeySize do
 | foreach gate j ∈ Netlist do
 |  | Compute FaultImpact;
 | end
 | Select the gate with the highest FaultImpact;
 | Insert XOR gate and update the NetList;
 | Apply Test Patterns;
end
```

Exemplary Logic Encryption Cell

While XOR/XNOR gates can provide wrong outputs for wrong keys, an exemplary PUF circuit can be incorporated into each IC to produce a unique key for that IC. Previously, to make an encrypted design functional, two keys, K$_{user}$ and P$_{challenge}$, can be given to the user. (See, e.g., Reference 3). P$_{challenge}$ can be typically applied as a challenge to the PUF. The resultant response from the PUF, P$_{response}$, can be used as a decryption key in an RSA decryption unit. K$_{user}$ can be used as the cipher text to the RSA decryption unit and the resultant plain text can be K$_D$, the key to make the encrypted design functional. (See, e.g., Reference 3). The RSA unit can prevent the user from determining K$_D$ from the user keys, K$_{user}$ and P$_{challenge}$.

Figure 2A:
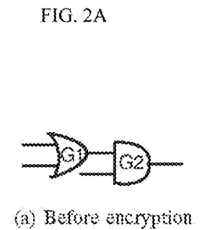
FIGS. 2(a) and 2(b) are exemplary illustrations of an exemplary logic encryption cell according to certain exemplary embodiments of the present disclosure.
Figure 2B:
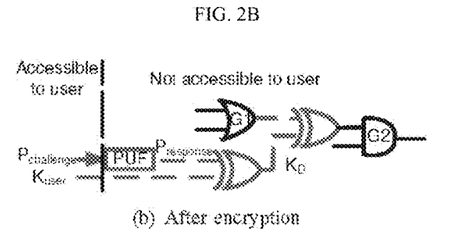

The above-indicated mechanism can facilitate each IC to have its own decryption key as different PUFs will generally produce different responses for the same challenge by leveraging the IC's inherent process variation. Such different responses can result in different decryption keys in the RSA decryption unit, and the resultant plain texts can be different from KD. Thus, each IC can have its own decryption key, and the key meant for one IC cannot be used for another IC. However, an RSA decryption unit typically consists of 10,000 gates thereby resulting in a huge area overhead. (See, e.g., References 3 and 10). This problem can be overcome by using a simple structure called a Logic Encryption Cell ("LE"C), which is shown in FIG. 2. For example, the RSA decryption unit can be replaced with a set of XOR gates to obtain K$_D$ from K$_{user}$ and P$_{response}$, the response from the PUF. In this exemplary LEC, to determine K$_D$, the attacker preferably has access to K$_{user}$ and P$_{response}$. However, the attacker cannot determine P$_{response}$ from P$_{challenge}$ due to the PUF circuit's characteristics. Thus, the exemplary LEC including PUF and XOR/XNOR gates can provide a security level equivalent to the logic encryption mechanism that uses a PUF and an RSA unit with XOR/XNOR gates.

Exemplary Results

Exemplary Experimental Setup

The effectiveness of the exemplary technique can be analyzed using ISCAS-85 combinational benchmarks. For example, the HOPE fault simulation tool (see, e.g., Reference 11) can be used to calculate or determine the fault impact of each gate. For example, 1000 random input patterns can be applied to a netlist and the true outputs can be observed. The key size can be 128 bits. The fault impact for the possible faults in the circuit can then be calculated. Valid and random wrong keys can be applied to an encrypted netlist, and the Hamming distance between the corresponding outputs can be determined. The area, power, and delay overhead can be obtained using the Cadence RTL compiler.

Exemplary Analysis of Hamming Distance

Figure 3A:
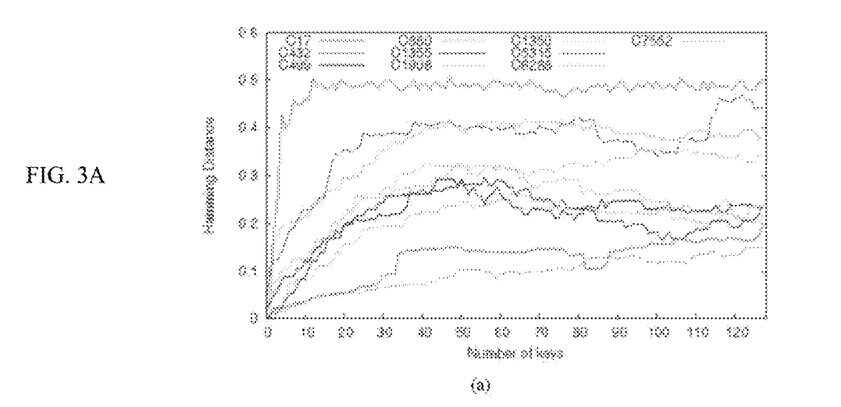
FIGS. 3(a) and 3(b) are exemplary graphs comparing a Hamming Distance between correct and wrong outputs on application of a wrong key for random insertion based logic encryption and fault analysis based logic encryption according to certain exemplary embodiments of the present disclosure.
Figure 3B:
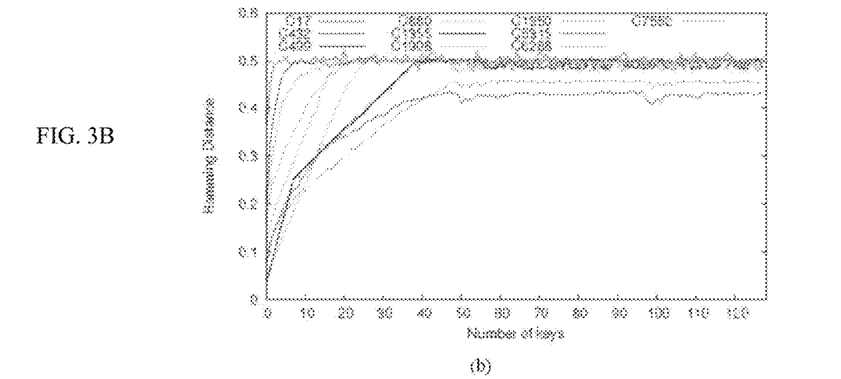

A fault analysis based approach can be compared with the random insertion approach (see, e.g., Reference 3) and the corresponding exemplary results are shown in FIG. 3. When the XOR/XNOR gates are randomly inserted, 50% Hamming distance is typically not achieved except for the smallest benchmark C17. Masking of faults can be the main reason for this poor performance. The effect of wrong keys can be blocked for most of the input patterns as discussed in Example 4. However, the exemplary fault analysis based insertion can achieve 50% Hamming distance for the benchmarks except for two benchmarks—C5315 and C7552. The number of outputs in benchmarks C5315 and C7552 can be 123 and 108, respectively, which can be very high, and therefore, it can be hard to achieve the 50% mark. However, the exemplary fault analysis based approach can perform well in all the other benchmarks as it takes the fault masking effects into account.

The slope of the lines shown in FIGS. 3(a) and 3(b) indicate the performance of the random and the exemplary fault analysis based insertions. If the line is steeper, 50% Hamming distance can be achieved with a smaller number of additional gates that are inserted for encryption, therefore, performance overhead can be smaller. Thus, the exemplary fault analysis-based logic encryption can have a smaller overhead than a random insertion as it uses a smaller number of additional gates to achieve the target Hamming distance. In the exemplary fault analysis based logic encryption, once the benchmarks achieve the 50% mark, the Hamming distance value likely does not deviate more on the insertion of more gates. Therefore, it can be possible to increase the key size without deviating more from the Hamming distance from the 50% mark.

TABLE I

Exemplary number of XOR/XNOR gates to achieve 50% Hamming distance using the exemplary fault analysis based logic encryption and the corresponding Hamming distance for random insertion based logic encryption.

| Benchmark | No. of XOR/XNOR gates | Hamming distance (%) | |
|---|---|---|---|
| | | Random | Fault analysis |
| C17 | 6 | 42 | 51 |
| C432 | 17 | 29 | 50 |
| C499 | 40 | 26 | 50 |
| C880 | 28 | 19 | 50 |
| C1355 | 42 | 26 | 50 |
| C1908 | 28 | 26 | 50 |
| C3540 | 22 | 23 | 50 |
| C5315 | 97 | 15 | 44 |
| C6288 | 27 | 32 | 50 |
| C7552 | 89 | 13 | 46 |

Table I above compares the Hamming distance between a random insertion and the exemplary fault analysis based logic encryptions. The second column shows the number of XOR/XNOR gates to be inserted to achieve 50% Hamming distance using the exemplary fault analysis based insertion approach. The third and fourth columns show the corresponding Hamming distance of the random insertion and the exemplary fault analysis based logic encryptions, respectively, for the number of XOR/XNOR gates listed in the second column. It can be seen that, on average, the exemplary fault analysis based logic encryption can achieve a Hamming distance value that can be twice that of the random insertion (except for the smallest benchmark C17). This can be because the exemplary fault analysis based logic encryption can identify more effective locations to insert the gates than the random insertion based logic encryption.

Exemplary Resiliency Against Attacks

Even though a logic encryption technique can meet a security criterion, it can be susceptible to several attacks, which are described below:

1) Brute force attack: In this attack, the attacker can apply, for example, all combinations of key bits and try to figure out the correct key. Increasing the key size to a large value (e.g., 28) can make this attack computationally infeasible for an attacker. However, increasing the key size should not degrade other security properties. While increasing the key size can decrease the Hamming distance for random insertion based logic encryption, the Hamming distance value may not be degraded for the exemplary fault analysis based logic encryption as depicted in FIGS. 3(a) and FIG. 3(b).

2) Collusion attack: In this attack, the attacker can use the key meant for $IC_X$ on $IC_Y$. However, when the $IC_X$'s key is used on $IC_Y$, the resulting response from $PUF_Y$ can be different from the $PUF_X$. A wrong value can be applied to the key inputs of the encrypted design in $IC_Y$, and the circuit will not produce correct outputs.

3) LEC removal attack: The attacker can attempt to remove the LECs from the encrypted netlist and replace them randomly with a buffer or an inverter. However, the attacker cannot easily distinguish between the XOR/XNOR gates used for encryption and the gates in the original netlist as a logic synthesizer can merge the XOR/XNOR gates with the original gates in the netlist.

Exemplary Power and Delay Overhead

Figure 4:
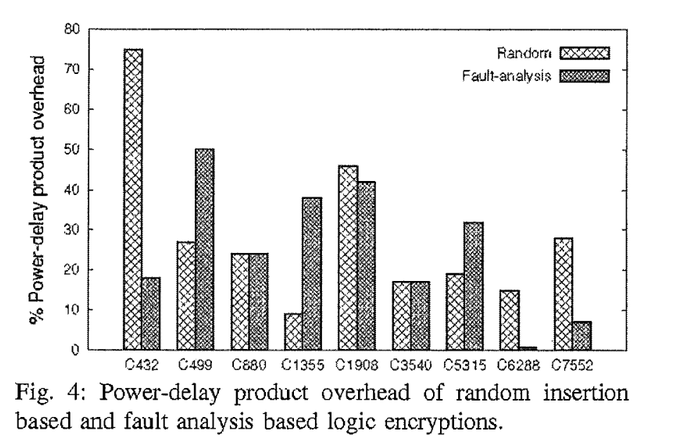
FIG. 4 is an exemplary graph comparing a power-delay of random insertion for logic encryption and fault analysis-based logic encryption according to certain exemplary embodiments of the present disclosure.

FIG. 4 shows a graph of the exemplary power-delay product overhead of the benchmarks that are encrypted with the number of XOR/XNOR gates listed in the second column of Table I. For example, the overhead for the C17 circuit can be 262% and 480% using the random insertion, and the exemplary fault analysis based logic encryptions, respectively. For the benchmarks C499, C1355, C3540, and C5315, the exemplary fault analysis based logic encryption can insert the XOR/XNOR gates at the critical path of the design thereby increasing the delay of the circuit. For the benchmarks C6228 and C7552, the XOR/XNOR gates can be inserted in paths with high slack. Therefore, the impact on the power-delay product can be low. Even though for some of the benchmarks the random insertion based logic encryption can have a smaller overhead, it can achieve only half the Hamming distance value achieved by the exemplary fault analysis based logic encryption.

Exemplary Area Overhead

Figure 5:
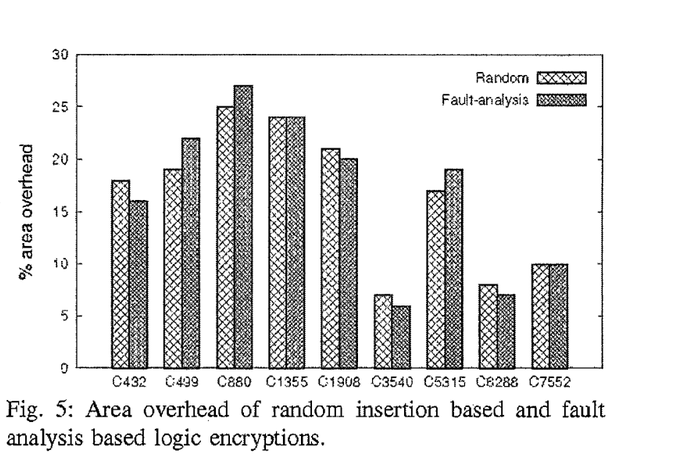
FIG. 5 is an exemplary graph comparing an area overhead of random insertion based on the logic encryption and the fault analysis-based logic encryption according to certain exemplary embodiments of the present disclosure.

FIG. 5 shows an exemplary graph of the exemplary area overhead of the benchmarks that are encrypted with the number of gates shown in the second column of Table I. In such exemplary graph, the overhead due to the PUF and XOR gates in the LEC are not included as both techniques can use the similar LEC structure. Even though the same number of XOR/XNOR gates are inserted in both the methods, depending upon the inserted XOR/XNOR gates' location, the logic synthesizer can merge the inserted XOR/XNOR gates, and the gates in the original netlist. Therefore, the area overhead can be different for the exemplary fault analysis based logic encryption and random insertion based logic encryption. However, for a given overhead (e.g., number of gates) the exemplary fault analysis based logic encryption can have better security properties (e.g., Hamming distance) than random insertion. A RSA decryption unit (see, e.g., Reference 3) can have an overhead of 10,000 gates. (See, e.g., References 3 and 10). This RSA can be replaced with 128 XOR gates without reduction in security.

Exemplary Discussion

Beyond Hamming Distance Criterion

Satisfying the Hamming distance criterion does not necessarily mean that the encryption technique is strong. Fiestel et al. described the avalanche criterion for a stronger evaluation. (See, e.g., Reference 12). An encrypted function/design can satisfy the avalanche criterion if changing one key bit changes half of the output bits.

The avalanche factor of a design with N key bits and M outputs can be defined as:

$$\text{Avalanche factor} = \frac{1}{M \times 2^N} \times \sum_{j=1}^{M} \sum_{i=1}^{N} a_{i,j} \quad (2)$$

where $a_{i,j}$ can be '1' if flipping the key input 'i' flips the output bit 'j'. When 'N' is large, a random set of patterns from 0 to $2^N$ can be selected and applied. According to the avalanche criterion, the avalanche factor can be 50%. Strong encryption techniques such as AES and DES (see, e.g., References 12 and 13) have an avalanche factor of 50%.

Figure 6:
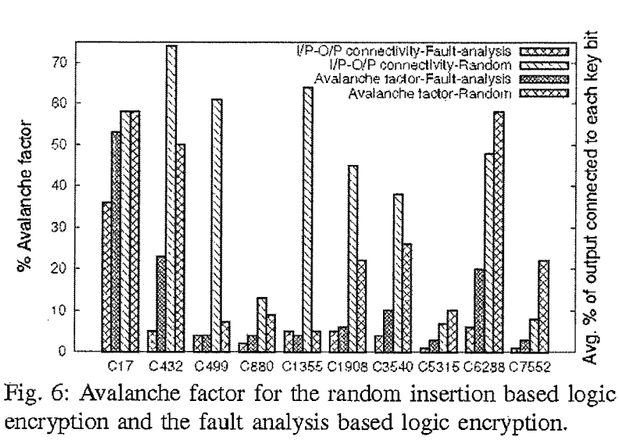
FIG. 6 is an exemplary graph comparing an avalanche factor of random insertion based logic encryption and fault analysis based logic encryption according to certain exemplary embodiments of the present disclosure.

The strength of the random and the exemplary fault analysis-based logic encryption techniques, in terms of the avalanche criterion, is described below. FIG. 6 shows an exemplary graph of the avalanche factor for the benchmarks. The smallest benchmark, C17, achieved the 50% target for the avalanche criterion when encrypted using the exemplary fault analysis based approach. For the other benchmarks, neither of the techniques achieved the 50% target for the avalanche criterion. The avalanche factor can be low in both types of encryption because the key bits are not connected to all output bits.

The average percentage of output bits connected to each key bit can be plotted in FIG. 6, which can show that the connectivity, on average, can be 45% and 18% for random insertion and the exemplary fault analysis based logic encryption techniques, respectively. Even though random insertion based logic encryption has a better connectivity between outputs and key bits, it has a lower avalanche factor than the exemplary fault analysis based logic encryption. This can be because in random insertion based logic encryption, the propagation of faults to the outputs can be blocked whereas the exemplary fault analysis based logic encryption can enable the fault propagation.

Beyond XOR/XNOR Gates

It can also be possible to use other gates such as the AND, the OR, the inverter, and the multiplexer to perform logic encryption. The security properties of the design can vary depending upon the type of gates used for encryption.

Beyond PUFs

While PUFs can be a low-cost security primitive to provide unique per-chip keys, their stability can be affected by device aging and operating conditions. Thus, they can require special error correcting mechanisms. (See, e.g., Reference 14). Instead of PUFs, one can use simple fuse-based RAMs and program the keys into them in different ICs to create unique keys for each chip.

Figure 7:
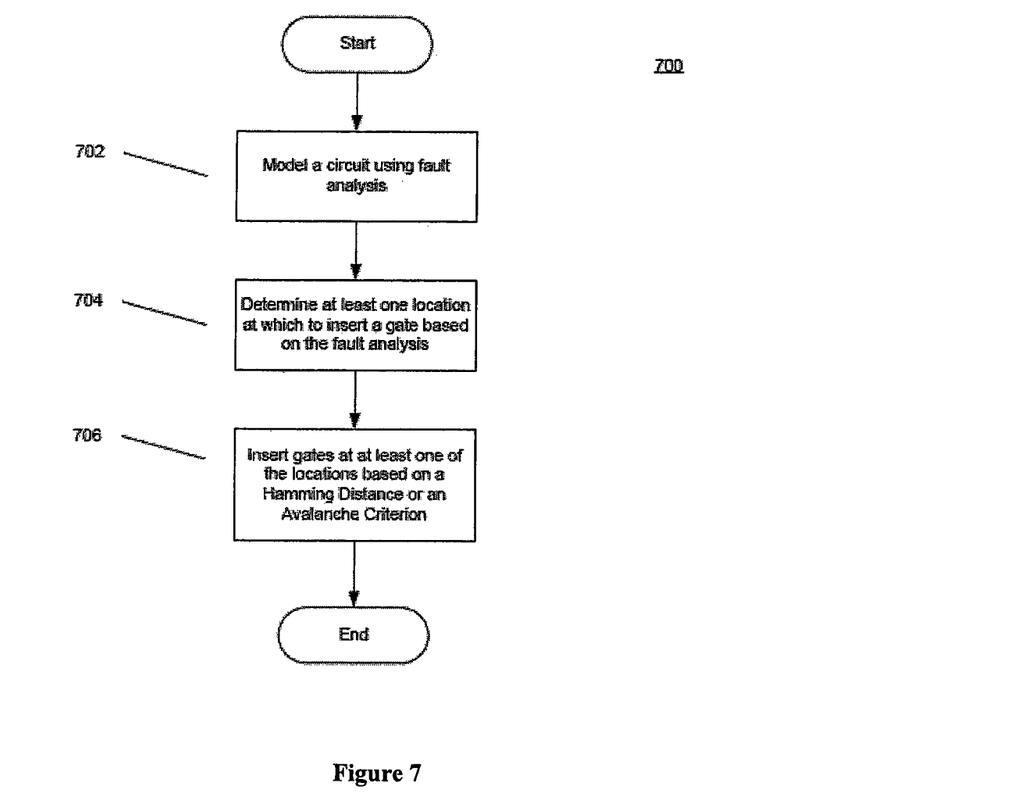
FIG. 7 is a flow diagram of an exemplary process according to certain exemplary embodiments of the present disclosure.

FIG. 7 shows an exemplary process 700 of encrypting a circuit according to certain exemplary embodiments of the present disclosure, which can be performed, for example, using a hardware computer processing arrangement. In exemplary method 700, a circuit can be modeled using fault analysis (procedure 702). The fault-analysis modeled circuit can be used to determine locations at which gates can be inserted (procedure 704). Next, gates can be inserted at at least some of the locations (procedure 706). This determination can be made as described above using an iterative procedure, and can also be made based on a Hamming distance or an Avalanche Criterion.

Figure 8:
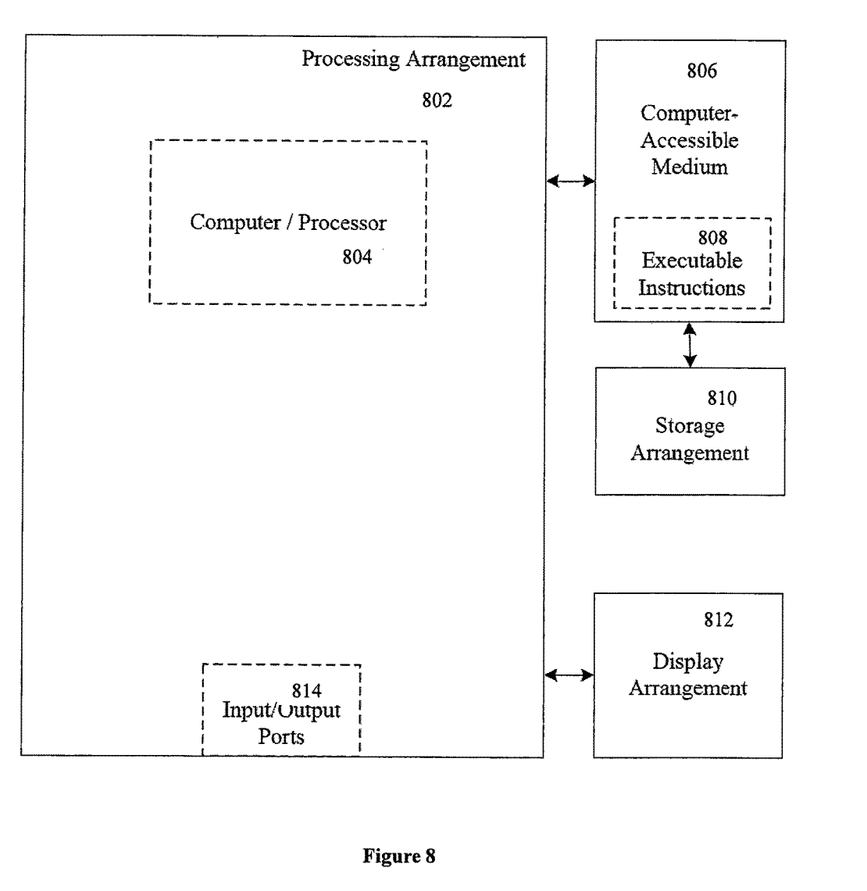
FIG. 8 is an illustration of an exemplary block diagram of an exemplary system in accordance with certain exemplary embodiments of the present disclosure.

FIG. 8 shows an exemplary block diagram of an exemplary embodiment of a system according to the present disclosure. For example, exemplary procedures in accordance with the present disclosure described herein can be performed by a processing arrangement and/or a computing arrangement 802. Such processing/computing arrangement 802 can be, e.g., entirely or a part of, or include, but not limited to, a computer/processor 804 that can include, e.g., one or more microprocessors, and use instructions stored on a computer-accessible medium (e.g., RAM, ROM, hard drive, or other storage device).

As shown in FIG. 8, e.g., a computer-accessible medium 806 (e.g., as described herein above, a storage device such as a hard disk, floppy disk, memory stick, CD-ROM, RAM, ROM, etc., or a collection thereof) can be provided (e.g., in communication with the processing arrangement 802). The computer-accessible medium 806 can contain executable instructions 808 thereon. In addition or alternatively, a storage arrangement 810 can be provided separately from the computer-accessible medium 806, which can provide the instructions to the processing arrangement 802 so as to configure the processing arrangement to execute certain exemplary procedures, processes and methods, as described herein above, for example.

Further, the exemplary processing arrangement 802 can be provided with or include an input/output arrangement 814, which can include, e.g., a wired network, a wireless network, the internet, an intranet, a data collection probe, a sensor, etc. As shown in FIG. 8, the exemplary processing arrangement 802 can be in communication with an exemplary display arrangement 812, which, according to certain exemplary embodiments of the present disclosure, can be a touch-screen configured for inputting information to the processing arrangement in addition to outputting information from the processing arrangement, for example. Further, the exemplary display 812 and/or a storage arrangement 810 can be used to display and/or store data in a user-accessible format and/or user-readable format.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. It should be understood that the exemplary procedures described herein can be stored on any computer accessible medium, including a hard drive, RAM, ROM, removable disks, CD-ROM, memory sticks, etc., and executed by a processing arrangement and/or computing arrangement which can be and/or include a hardware processors, microprocessor, mini, macro, mainframe, etc., including a plurality and/or combination thereof. In addition, certain terms used in the present disclosure, including the specification, drawings and claims thereof, can be used synonymously in certain instances, including, but not limited to, e.g., data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

EXEMPLARY REFERENCES

The following references are hereby incorporated by reference in their entirety.

[1] KPMG, "Managing the risks of counterfeiting in the information technology," 2006.

[2] SEMI, "Innovation is at risk as semiconductor equipment and materials industry loses up to $4 billion annually due to IP infringement," 2008.

[3] J. Roy, F. Koushanfar, and I. Markov, "EPIC: Ending Piracy of Integrated Circuits," *Proceedings of the IEEE/ACM Design, Automation and Test in Europe*, pp. 1069-1074, 2008.

[4] "Defense Science Board (DSB) study on High Performance Microchip Supply," February 2005.

[5] Y. Alkabani and F. Koushanfar, "Active hardware metering for intellectual property protection and security," *Proceedings of USENIX security*, pp. 291-306, 2007.

[6] R. Chakraborty and S. Bhunia, "HARPOON: An Obfuscation-Based SoC Design Methodology for Hardware Protection," *IEEE Transactions on Computer-Aided Design of Integrated Circuits and Systems*, vol. 28, No. 10, pp. 1493-1502, 2009.

[7] A. Baumgarten, A. Tyagi, and J. Zambreno, "Preventing IC Piracy Using Reconfigurable Logic Barriers," *IEEE Design and Test of Computers*, vol. 27, No. 1, pp. 66-75, 2010.

[8] G. Suh and S. Devadas, "Physical Unclonable Functions for Device Authentication and Secret Key Generation," *Proceedings of the IEEE/ACM Design Automation Conference*, pp. 9-14, 2007.

[9] M. L. Bushnell and V. D. Agrawal, "Essentials of Electronic Testing for Digital, Memory, and Mixed-Signal VLSI Circuits," *Kluwer Academic Publishers, Boston*, 2000.

[10] "Sciworx RSA Co-Processor".

[11] H. Lee and D. S. Ha, "HOPE: An Efficient Parallel Fault Simulator for Synchronous Sequential Circuits," *IEEE Transactions on Computer-Aided Design of Integrated Circuits and Systems*, vol. 15, No. 9, pp. 1048-1058, 1996.

[12] H. Heys and S. Tavares, "Avalanche characteristics of substitution-permutation encryption networks," *IEEE Transactions on Computers*, vol. 44, No. 9, pp. 1131-1139, 1995.

[13] "Specification for the Advanced Encryption Standard (AES)," *Federal Information Processing Standards Publication* 197, 2001.

[14] M.-D. Yu and S. Devadas, "Secure and Robust Error Correction for Physical Unclonable Functions," *IEEE Design and Test of Computers*, vol. 27, No. 1, pp. 48-65, 2010.

What is claimed is:

1. A process for encrypting a circuit, comprising:
identifying a location of at least one wire in the circuit, wherein at least one stuck-at fault on the at least one wire is activated and propagated by a plurality of random input patterns to a particular number of outputs of the circuit; and
encrypting the circuit by:
modifying a circuit design by adding at least one of (i) at least one XOR gate controlled by at least one key bit at the location of the at least one wire or (ii) at least one XNOR gate controlled by the at least one key bit at the location of the at least one wire; and
storing, in an electronic storage device of the circuit, the at least one key bit that nullifies an effect of the at least one stuck-at fault for at least one of the random input patterns thereby restoring a functionality of an original design of the circuit.

2. The process of claim 1, wherein the at least one key bit is a particular key bit that is specific to the circuit.

3. The process of claim 2, wherein the particular key bit is based on at least one Physical Unclonable Function inserted into the circuit.

4. The process of claim 1, wherein the particular number of outputs is based on at least one of a Hamming Distance or an Avalanche Criterion.

5. The process of claim 1, wherein the particular number of outputs is in a range of 40% to 60% of a total number of outputs of the circuit.

6. The process of claim 1, wherein the identifying the location of the at least one wire is based on the random input patterns.

7. The process of claim 1, further comprising inserting at least one of (i) at least one further XOR gate or (ii) at least one further XNOR gate into a further location in the circuit based on the location of the at least one of (i) the at least one XOR gate or (ii) the at least one XNOR gate.

8. A non-transitory computer-readable medium including instructions thereon that are accessible by a hardware processing arrangement, wherein, when the processing arrangement executes the instructions, the processing arrangement is configured to perform procedures, comprising:
identifying a location of at least one wire in the circuit, wherein at least one stuck-at fault on the at least one wire is activated and propagated by a plurality of random input patterns to a particular number of outputs of the circuit; and encrypting the circuit by:
modifying a circuit design by adding at least one of (i) at least one XOR gate controlled by at least one key bit at the location of the at least one wire or (ii) at least one XNOR gate controlled by the at least one key bit at the location of the at least one wire; and
storing, in an electronic storage device of the circuit, the at least one key bit that nullifies an effect of the at least one stuck-at fault for at least one of the random input patterns thereby restoring a functionality of an original design of the circuit.

9. The process of claim 8, wherein the at least one key bit is a particular key bit that is specific to the circuit.

10. The process of claim 9, wherein the particular key bit is based on at least one Physical Unclonable Function inserted into the circuit.

11. The process of claim 8, wherein the particular number of outputs is based on at least one of a Hamming Distance or an Avalanche Criterion.

12. The process of claim 8, wherein the particular number of outputs is in a range of about 40% to about 60% of a total number of outputs of the circuit.

13. The process of claim 8, wherein the processing arrangement is configured to identify the location of the at least one wire based on the random input patterns.

14. The process of claim 8, wherein the processing arrangement is further configured to insert at least one of (i) at least one further XOR gate or (ii) at least one further XNOR gate into a further location in the circuit based on the location of the at least one of (i) the at least one XOR gate or (ii) the at least one XNOR gate.

15. A circuit, comprising:
at least one gate that is at least one of (i) at least one XOR gate controlled by at least one key bit or (ii) at least one XNOR gate controlled by the at least one key bit, wherein the at least one gate is added at a particular location in the circuit determined based on a location of at least one wire in the circuit, wherein at least one stuck-at fault on the at least one wire is activated and propagated by a plurality of random input patterns to a particular number of outputs of the circuit; and
an electronic storage device of the circuit, wherein the electronic storage device stores the at feast one key bit that nullifies an effect of the at least one stuck-at fault for at least one of the random input patterns thereby restoring a functionality of an original design of the circuit.

16. The circuit of claim 15, wherein the particular number of outputs is in a range of 40% to 60% of a total number of outputs of the circuit.

* * * * *